(12) United States Patent
Hikichi

(10) Patent No.: US 10,015,328 B2
(45) Date of Patent: Jul. 3, 2018

(54) SHEET MANAGEMENT APPARATUS, CONTROL METHOD OF SHEET MANAGEMENT APPARATUS, AND STORAGE MEDIUM

(71) Applicant: CANON KABUSHIKI KAISHA, Tokyo (JP)

(72) Inventor: Yukiyoshi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/476,474

(22) Filed: Sep. 3, 2014

(65) Prior Publication Data

US 2015/0062646 A1    Mar. 5, 2015

(30) Foreign Application Priority Data

Sep. 5, 2013 (JP) ................................. 2013-184051

(51) Int. Cl.
*H04N 1/00* (2006.01)
*H04N 1/23* (2006.01)

(52) U.S. Cl.
CPC ....... *H04N 1/00344* (2013.01); *H04N 1/0032* (2013.01); *H04N 1/2323* (2013.01)

(58) Field of Classification Search
None
See application file for complete search history.

(56) References Cited

U.S. PATENT DOCUMENTS

2009/0232528 A1* 9/2009 Togami .............. G03G 15/5029
                                                    399/45
2010/0111546 A1* 5/2010 Kubo ............................. 399/16
2011/0229237 A1* 9/2011 Hayashi ......................... 400/76

FOREIGN PATENT DOCUMENTS

JP    2007-241425 A    9/2007

* cited by examiner

*Primary Examiner* — Lennin RodriguezGonzalez
(74) *Attorney, Agent, or Firm* — Canon U.S.A., Inc. IP Division

(57) ABSTRACT

A sheet management apparatus includes a storing unit, an obtaining unit, and a setting unit. The storing unit stores a combination of first attribute information and second attribute information of sheets. The obtaining unit obtains, from the storing unit, the second attribute information stored in combination with the first attribute information, based on the first attribute information of sheets used in a job. The setting unit sets the second attribute information obtained by the obtaining unit, as attribute information of sheets stored a sheet holding unit.

10 Claims, 12 Drawing Sheets

FIG. 7

| REGISTRATION SCREEN | | | | |
|---|---|---|---|---|
| NAME | SIZE | GRAMMAGE | COLOR | TYPE |
| COMPANY A Media1 | A4 | 62 g/m² | WHITE | PLAIN PAPER |
| COMPANY A Media2 | A4 | 80 g/m² | YELLOW | PLAIN PAPER |
| COMPANY A Custom | A4 | 62 g/m² | RED | PLAIN PAPER |
| COMPANY B Premium | A3 | 128 g/m² | WHITE | HEAVY PAPER |
| COMPANY C Excellent | B4 | 150 g/m² | WHITE | HEAVY PAPER |
| Paper1 | A3 | 64 g/m² | BLUE | COATED PAPER |
| Paper2 | A3 | 80 g/m² | WHITE | PLAIN PAPER |
| MyPaper | A4 | 100 g/m² | YELLOW | TABBED PAPER |
| ... | ... | ... | ... | |

FIG. 8

SHEET HOLDING UNIT REGISTRATION SCREEN                                                                    801

| SHEET HOLDING UNIT | NAME | SIZE | GRAMMAGE | COLOR | TYPE | PRIORITY FLAG |
|---|---|---|---|---|---|---|
| Tray1 | COMPANY A Media1 | A4 | 62 g/m² | WHITE | PLAIN PAPER | TRUE |
| | COMPANY A Media2 | A4 | 80 g/m² | YELLOW | PLAIN PAPER | FALSE |
| | MyPaper | A4 | 100 g/m² | WHITE | TABBED PAPER | FALSE |
| | Paper1 | A3 | 64 g/m² | BLUE | COATED PAPER | FALSE |
| | Paper2 | A3 | 80 g/m² | WHITE | PLAIN PAPER | TRUE |
| Tray2 | COMPANY A Custom | A4 | 62 g/m² | RED | PLAIN PAPER | TRUE |
| | Paper2 | A3 | 80 g/m² | WHITE | PLAIN PAPER | FALSE |
| | COMPANY B Premium | A3 | 128 g/m² | WHITE | HEAVY PAPER | TRUE |
| ... | ... | ... | ... | ... | ... | ... |

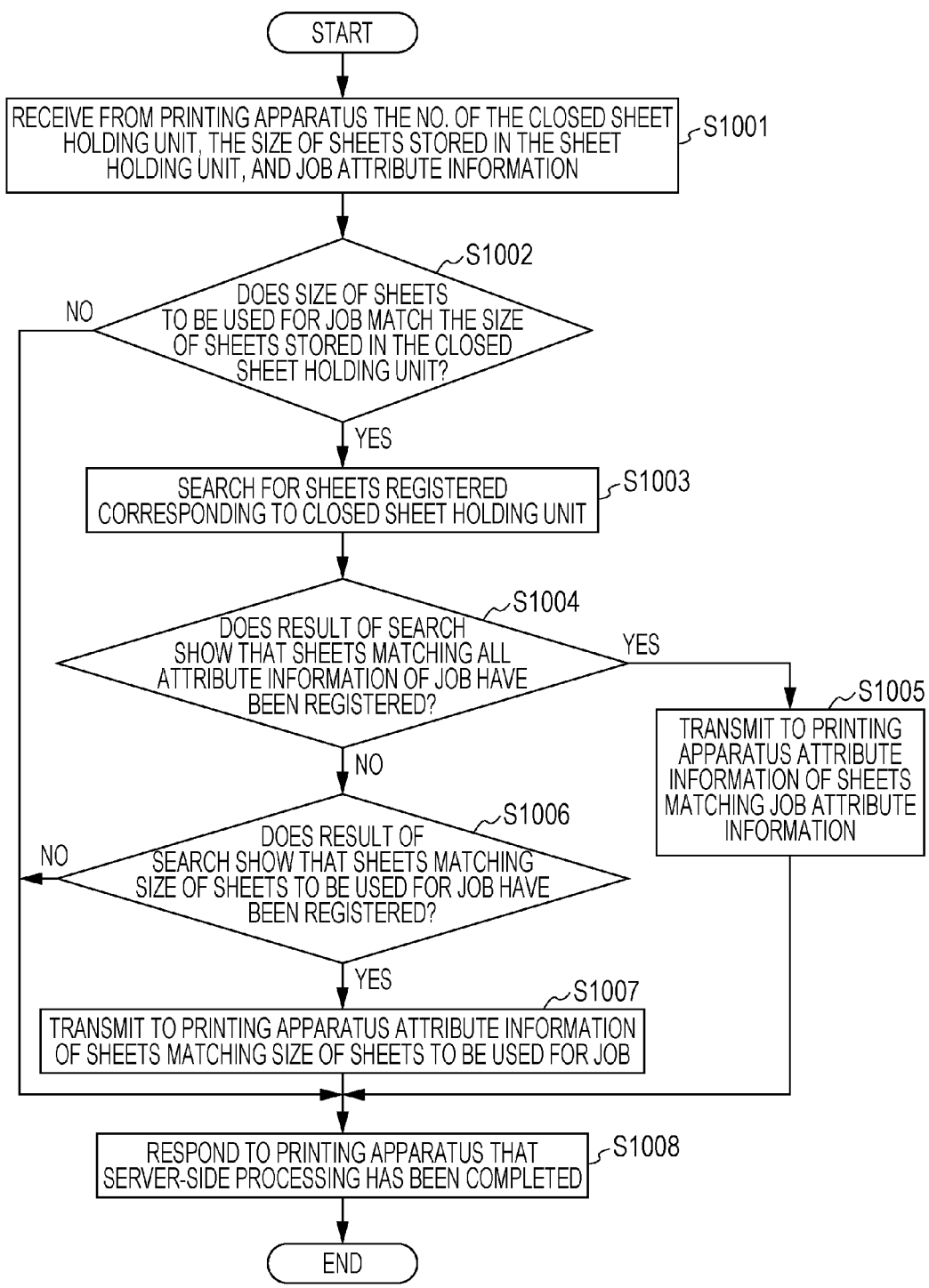

FIG. 11

| SHEET HOLDING UNIT | NAME | SIZE | GRAMMAGE | COLOR | TYPE | PRIORITY FLAG |
|---|---|---|---|---|---|---|
| ○ Tray1 | COMPANY A Media1 | A4 | 62 g/m² | WHITE | PLAIN PAPER | TRUE |
| ● Tray1 | COMPANY A Media2 | A4 | 80 g/m² | YELLOW | PLAIN PAPER | FALSE |
| ○ Tray1 | MyPaper | A4 | 100 g/m² | WHITE | TABBED PAPER | FALSE |

(!) SHEET NECESSARY FOR PRINTING NOT FOUND.

SHEETS CURRENTLY AVAILABLE ARE AS SHOWN BELOW.
SELECT A SHEET TO USE, AND REPLACE SHEETS.

INPUT JOB DATA
SIZE: A4, GRAMMAGE: 100 g/m², TYPE: PLAIN PAPER

REMOVE USED SHEETS FROM SHEET HOLDING UNIT

REMOVE SHEETS FROM Tray1.
TO USE SHEETS OF SAME A4 SIZE, REPLACE WITH NO. 1 PRIORITY SHEETS.

| SHEET HOLDING UNIT | NAME | SIZE | GRAMMAGE | COLOR | TYPE | PRIORITY FLAG |
|---|---|---|---|---|---|---|
| Tray1 | COMPANY A Media1 | A4 | 62 g/m² | WHITE | PLAIN PAPER | TRUE |
| Tray1 | COMPANY A Media2 | A4 | 80 g/m² | YELLOW | PLAIN PAPER | FALSE |
| Tray1 | MyPaper | A4 | 100 g/m² | WHITE | TABBED PAPER | FALSE |

OK

SHEET MANAGEMENT APPARATUS, CONTROL METHOD OF SHEET MANAGEMENT APPARATUS, AND STORAGE MEDIUM

BACKGROUND OF THE INVENTION

Field of the Invention

The present invention relates to a sheet management apparatus which stores attribute information relating to sheets, a control method of the sheet management apparatus, and a storage medium.

Description of the Related Art

When printing using a printing apparatus having sheet storing units, sheet attribute information such as the name of sheets, the size of sheets, the grammage of sheets, the surface nature of sheets, the color of sheets, and so forth, has often been set to the sheet storing unit beforehand as setting values. It is troublesome to input sheet attribute information each time for each sheet storing unit in order to save the sheet attribute information as the setting values for the sheet storing unit. Accordingly, there is known a method where attribute information for each of these sheets is registered in a sheet management database beforehand, and the user selects the attribute information of a desired sheet and saves this as the setting values for the sheet storing unit (see Japanese Patent Laid-Open No. 2007-241425).

However, if the number of types of sheets saved in the sheet management database becomes great in the technique described in Japanese Patent Laid-Open No. 2007-241425, it becomes troublesome for the user to find the desired sheet each time from the great number of sheet types registered therein.

Also, if attribute information of sheets to be used for a job is not registered to any of the sheet storing units, execution of the job will be stopped in this state. Accordingly, in such a case the user has had to find the attribute information of the sheets to be used for the job from the sheet management database and save this attribute information to one of the sheet storing units, to keep execution of the job from being stopped. This is problematic in that user operations are troublesome.

SUMMARY OF THE INVENTION

According to an aspect of the present invention, a sheet management apparatus includes a storing unit configured to store a combination of first attribute information and second attribute information of sheets, an obtaining unit configured to obtain, from the storing unit, the second attribute information stored in combination with the first attribute information, based on the first attribute information of sheets used in a job, and a setting unit configured to set the second attribute information obtained by the obtaining unit, as attribute information of sheets stored a sheet holding unit.

Further features of the present invention will become apparent from the following description of exemplary embodiments with reference to the attached drawings.

BRIEF DESCRIPTION OF THE DRAWINGS

FIG. 7 is a diagram illustrating an example of a registration screen of sheet information registered in the sheet information storing unit in the server according to the first embodiment.

FIG. 8 is a diagram illustrating an example of a registration screen of sheet information registered in the sheet holding unit information storing unit for individual sheet holding units, in the server according to the first embodiment.

FIG. 10 is a flowchart for describing processing to search for sheets registered in the sheet holding unit information storing unit, based on received job attribute information, in the server according to the first embodiment.

FIG. 11 is a diagram illustrating an example of a selection screen displayed on an operation unit, in the printing apparatus according to the first embodiment.

FIG. 12 is a diagram illustrating an example of a warning screen displayed on the operation unit, in the printing apparatus according to the first embodiment.

DESCRIPTION OF THE EMBODIMENTS

Embodiments of the present invention will be described in detail with reference to the attached drawings. It should be noted that the embodiments do not restrict the present invention, and that the scope of the present invention is to be interpreted according to the claims. Also, not all combinations of features described in the embodiments are necessarily essential to the present invention.

First Embodiment

Digital Printing System

Figure 1:
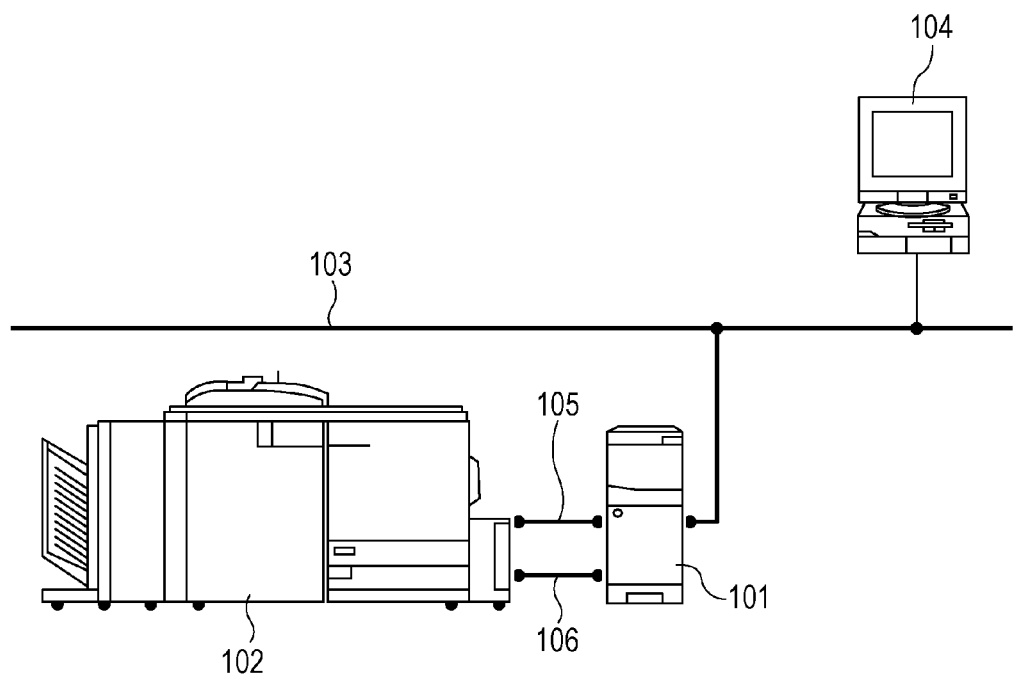
FIG. 1 is a diagram for describing a digital printing system according to a first embodiment of the present invention.

A digital printing system according to a first embodiment of the present invention will be described with reference to FIG. 1. A digital printing machine (printing apparatus) 102 has various functions such as scanning, printing, copying, and so forth. A server 101 has various functions, such as image processing, such as printing control, job management, and so forth. An information processing apparatus (computer) 104 has functions such as editing application files, giving printing instructions, and so forth.

In the digital printing system, the printing machine 102 and server 101 are connected via a network 105 and video cable 106. Also, the server 101 and information processing apparatus 104 are communicably connected by a network 103 such as a local area network (LAN), wide area network (WAN), or the like, or a wireless LAN or the like. The video cable 106 is used to transfer print images, and the network 105 is used to exchange other information. Unless specifically stated otherwise, the network used to connect the printing machine 102 and the server 101 may be a LAN, WAN, or other like network, as long as functions of the present invention can be executed.

Note that description will be made in the present embodiment regarding an arrangement where the information processing apparatus 104 and printing machine 102 do not directly exchange data or commands. In the present embodiment, the information processing apparatus 104 exchanges various types of data with the printing machine 102 via the server 101. The server 101 also receives printing jobs from the information processing apparatus 104 connected thereto by a network 103, and transfers the received printing jobs to the printing machine 102. The user can confirm job status, state of the server 101 and printing machine 102, and so forth, using the information processing apparatus 104. The user can also save attribute information of sheets, as setting values for sheet holding units of the printing machine 102, in the printing machine 102 for example, by directly or remotely operating the server 101.

Note that in a case where the information processing apparatus 104 takes on the role of operations of the server 101, the information processing apparatus 104 and printing machine 102 may directly exchange data and commands. In such a case, the configuration of the information processing apparatus 104 is the same as the configuration of the server 101 except for being connected to the printing machine 102 by the network 105 and video cable 106.

Server Configuration

Figure 2:
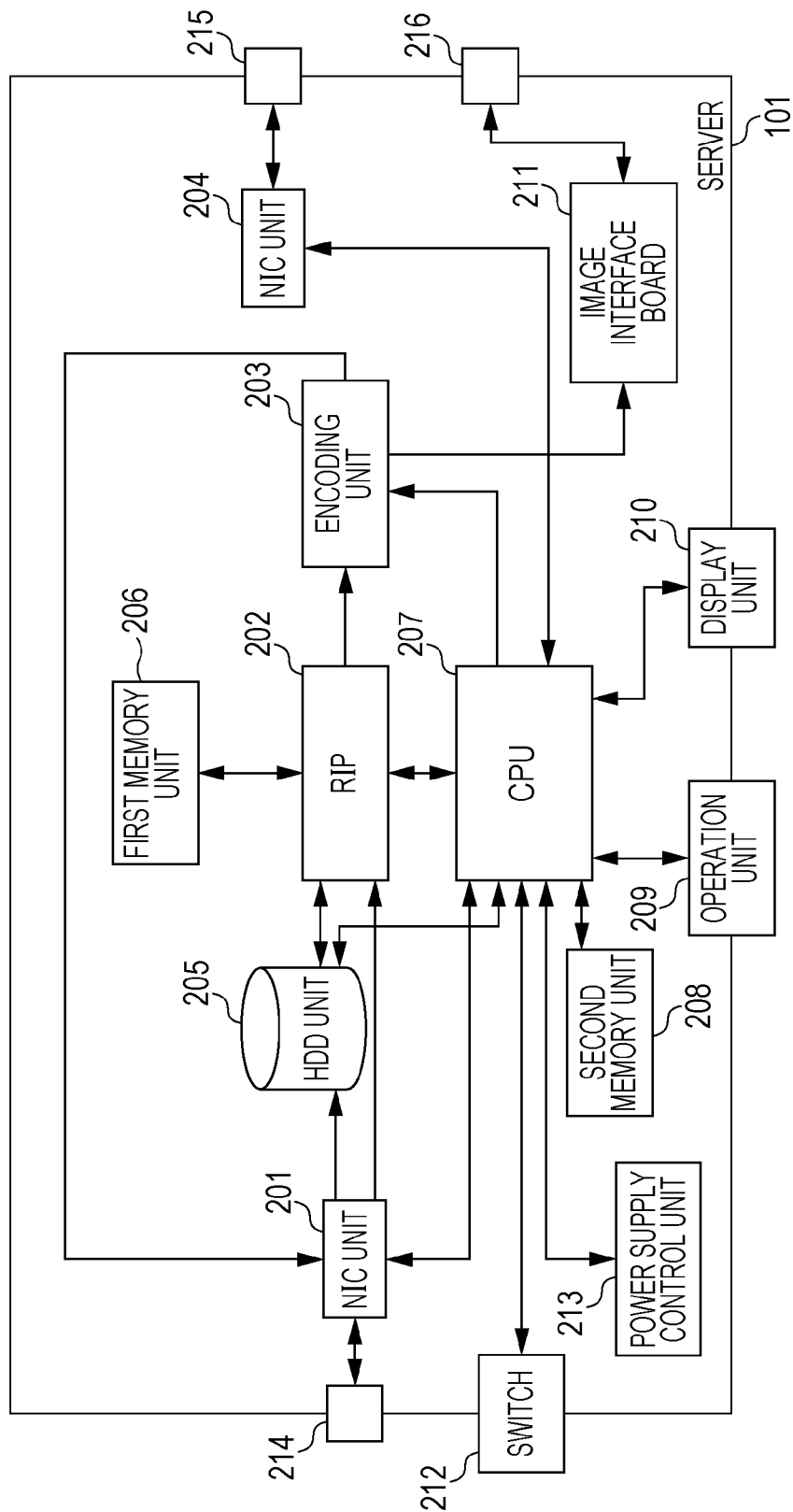
FIG. 2 is a block diagram illustrating the configuration of a server according to the first embodiment.

An example of the configuration of the server 101 according to the first embodiment of the present invention will be described with reference to FIG. 2.

A Network Interface Card (NIC) unit 201 is a first network interface which handles low layer level connection to the network 103. A NIC unit 204 is a second network interface which handles low layer level connection.

A raster image processor (RIP) 202 performs processing to rasterize a print language such as Page Description Language (PDL) data or data of a particular data format that has been received by the NIC unit 201.

An encoding unit 203 performs processing to convert rasterized data into print data or other data of a format which the printing machine 102 supports.

Figure 4:
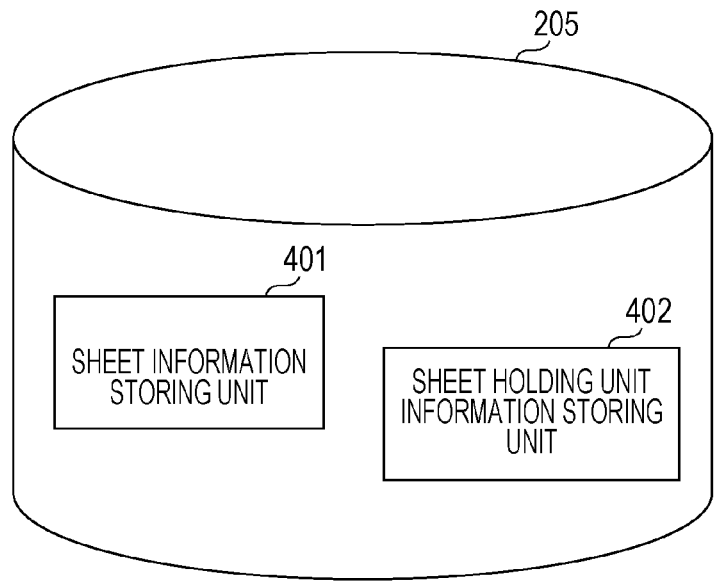
FIG. 4 is a diagram for describing data stored in hard disk drive unit in the server according to the first embodiment.

A hard disk drive (HDD) unit 205 temporarily stores (spools) the PDL data received by the NIC unit 201. The HDD unit 205 also temporarily stores post-RIP compressed data. The HDD unit 205 holds data stored in a later-described sheet information storing unit 401 and sheet holding unit information storing unit 402 which are illustrated in FIG. 4, and also holds system software for carrying out the later-described processes. Data stored in the sheet information storing unit 401 and sheet holding unit information storing unit 402 may be held in nonvolatile memory such as a solid state drive (SSD), instead of the HDD unit 205.

A central processing unit (CPU) 207 controls the processes, operations, and so forth of the various units of the server 101. A first memory unit 206 is used for the RIP 202 to perform image rending processing. On the other hand, a second memory unit 208 is used by the CPU 207 as a temporary data storage area.

An operation unit 209 has buttons, keys, a touch panel, and so forth, and is used to perform operations on the server 101. A display unit 210 performs processing to convey information to the user through images and text. An image interface board 211 and a connector 216 for the image interface board 211 are used to create image data, and transfer over a dedicated transfer path. A switch 212 is used to for power supply shutdown and power supply activation operations by the user. Upon the switch 212 having been operated, an interrupt signal is delivered to the CPU 207. Upon detecting the interrupt signal, the CPU 207 controls a power supply control unit 213 in accordance with the current state.

Data packets from the information processing apparatus 104 to the server 101 are conveyed over the network 103 and input to the server 101 via a connector 214. Data reception processing is performed within the server 101 at the NIC unit 201. Upon receiving print data, received data is written to the HDD unit 205 as necessary, under control of the CPU 207. This is queuing (spooling), which is commonly performed to improve the data transfer rate. The data stored in the HDD unit 205 is read out by the RIP 202 under instruction by the CPU 207.

Next, encoding is performed at the encoding unit 203, serving as a data format converting unit, into a data format acceptable by the printing machine 102, based on a data format acceptable by the printing machine 102 that has been set beforehand, and the received data format. The data after encoding must be in a format acceptable at the printing machine 102.

Examples of the format include particular printing language formats, data formats where compression has been performed by a particular method such as JBIG or the like, and so forth, but an acceptable format depends on the capabilities of an interpreting unit built into the printing machine 102. The data thus encoded is packetized by the NIC unit 204 again, for transmission to the network 105. The packetized data is transmitted from the connector 215 and transmitted over the network 105 to the printing machine 102. The encoded data may be transmitted to the printing machine 102 over a local interface such as a Universal Serial Bus (USB) or the like.

The printing machine 102 which has received the data packets performs printing processing onto a printing medium such as a sheet or the like, following its own print process procedures.

Another data transfer method includes the data being transferred to the image interface board 211 via the encoding unit 203, and then being transmitted from the connector 216. The data is then transmitted to the printing machine 102 via the video cable 106. State information, relating to the power supply state of the server 101 and printing machine 102, whether the server 101 and printing machine 102 are in a normal activation state, and so forth, is obtained in a timely fashion, and the information processing apparatus 104 transmits data packets to the server 101, based on determination made from the obtained power supply state and activation state. Performing poling, where the power supply state of the server 101 and printing machine 102 and whether or not in a normal activation state is obtained at certain time intervals, enables state change notification packets transmitted by the server 101 and printing machine 102 to be received, and the information processing apparatus 104 changes processing accordingly. As one example, in a case of the information processing apparatus 104 receiving a power supply state notification packet, which is transmitted in a case where the printing machine 102 has shut down the power supply, the information processing apparatus 104 stops poling, so as to not place unnecessary traffic on the network.

Configuration of Printing Machine

Figure 3:
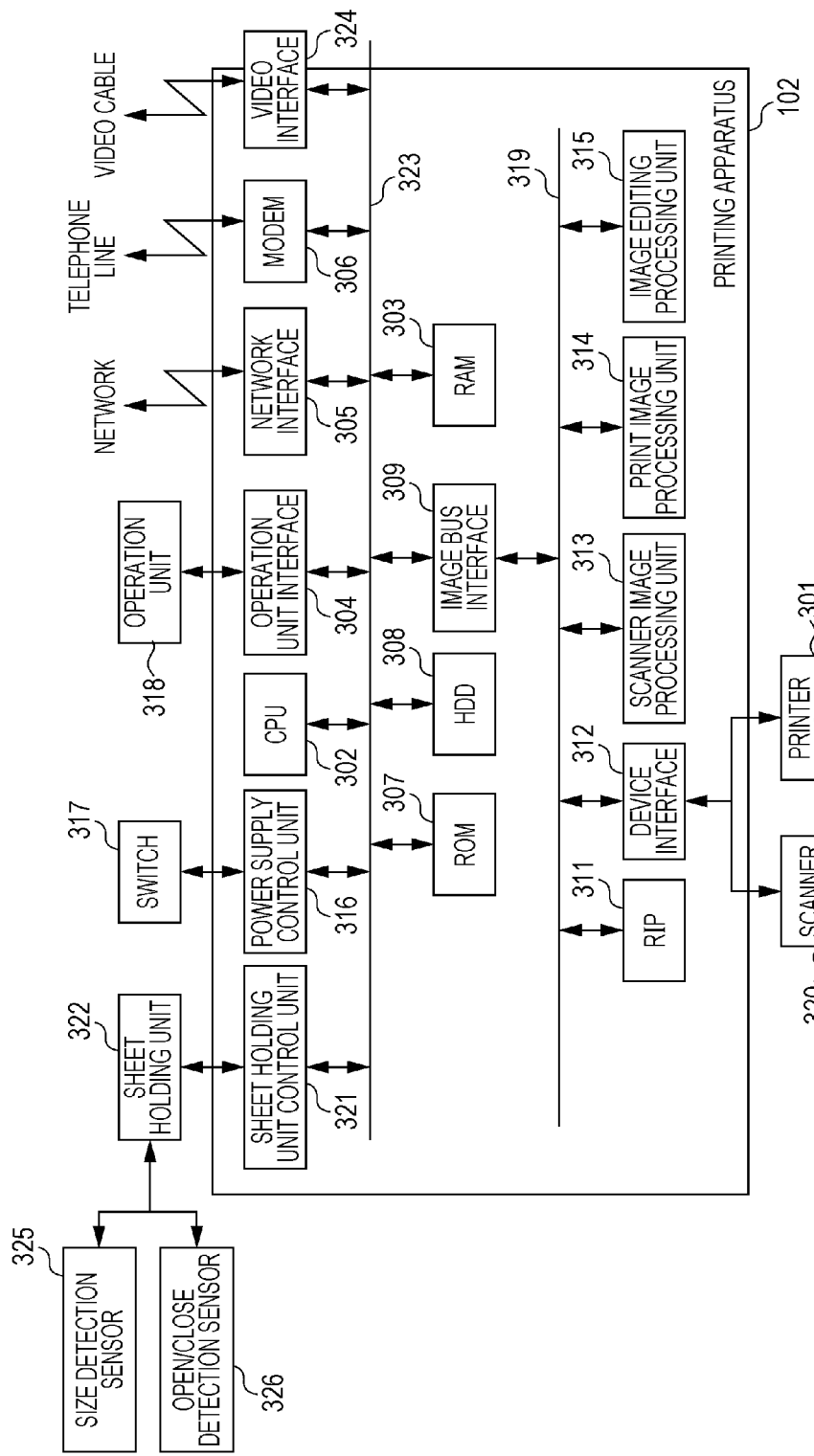
FIG. 3 is a block diagram illustrating the configuration of a printing apparatus according to the first embodiment.

An example of the configuration of the printing machine 102 according to the first embodiment of the present invention will be described with reference to FIG. 3. The printing machine 102 has multiple sheet holding units 322. Note that the multiple sheet holding units 322 may be sheet feed trays, manual feed trays, or configurations which can serve as either sheet feed trays or manual feed trays. Each sheet holding unit 322 includes a size detection sensor 325 to detect the size of the sheets stored in that sheet holding unit 322, open/close detection sensor 326 to detect opening/closing operations of the sheet holding unit 322, and so forth. The sheet holding unit 322 may also further have sensors for detecting the remaining amount of sheets stored therein, sensors for detecting the color and/or surface nature of sheets stored therein, and so forth.

The printing machine 102 is connected to a scanner 320 which is an image input device, a printer engine 301 which is an image output device, so as to perform control regarding reading of image data and printing output. The printing machine 102 can also control input/output of image information and device information over a network or video cable, by being connected to the network, a telephone line, and the video cable.

A CPU 302 is provided to control the overall printing machine 102. Random access memory (RAM) 303 serves as system work memory used when the CPU 302 is operating, and is image memory which temporarily stores input image data. Read-only memory (ROM) 307 is boot ROM storing a system boot program. An HDD 308 stores system software used for performing the later-described various types of processing, and input image data and so forth.

An operation unit interface 304 is an interface for an operation unit 318 having a display screen which can display image data and so forth. The operation unit interface 304 outputs operation screen data to the operation unit 318, and also serves to communicate information which the user has input from the operation unit 318 to the CPU 302. Note that the operation unit 318 is configured including a touch panel unit, and key input section, which are omitted from illustration. The operation unit 318 thus serves as various interfaces for the user to perform settings and operations of the printing machine 102 according to the first embodiment.

A network interface 305 is realized by a LAN card for example, and performs input/output of information with regard to external devices. A modem 306 is connected to a telephone line, and performs input/output of information with regard to external devices over a network. A video interface 324 is connected to a video cable, and performs input/output of information with regard to external devices. The above-described units are arranged on a system bus 323.

An image bus interface 309 is an interface for connecting the system bus 323 to an image bus 319 which transfers image data at a high speed, and serves as a bus bridge which converts data structure. Connected to the image bus 319 are a raster image processor (RIP) 311, a device interface 312, a scanner image processing unit 313, a printer image processing unit 314, and an image edit processing unit 315.

The RIP 311 renders PDL data into raster images. The device interface 312 performs synchronous/asynchronous conversion of image data as to the scanner 320 and printer engine 301. The scanner image processing unit 313 performs various types of processing, such as editing, on image data input from the scanner 320. The printer image processing unit 314 performs processing on image data to be output by printing, such as correction according to the printer engine, resolution conversion, and so forth. The image edit processing unit 315 performs various types of image processing, such as rotating image data, compression/decompression processing of image data, and so forth.

A switch 317 is for receiving power supply shutdown and power supply activation operations by the user. Upon the switch 317 having been operated, an interrupt signal is delivered from a power supply control unit 316 to the CPU 302. Upon detecting the interrupt signal, the CPU 302 controls the power supply control unit 316 in accordance with the current state.

A sheet holding unit control unit 321 is a module which saves sheet attribute information in sheet holding units 322 as setting values, and controls feeding of sheets. The sheet holding unit control unit 321 also holds setting information from the operation unit 318 and setting information received from the server 101, and sheet attribute information detected by the sheet holding units 322. The printing machine 102 controls printing based on sheet attribute information held as setting values for the sheet holding units 322. Examples of sheet attribute information include sheet size, grammage, color, type, and so forth.

For example, the printing machine 102 decides the sheet holding unit 322 from which sheets should be fed, based on the sheet size to be used for a printing job to be performed, and effects control such that sheets are fed from the sheet holding unit 322 which has been decided. The printing machine 102 also controls the sheet conveyance speed and fixing unit temperature based on the grammage and sheet type. The sheet holding unit control unit 321 obtains information relating to opening/closing operations of the sheet holding unit 322 from the open/close detection sensor 326, and detects whether an opened sheet holding unit 322 has been closed.

In the embodiments according to the present invention, the sheet information storing unit 401 and sheet holding unit information storing unit 402 are held as storage areas in the HDD unit 205 of the server 101, as illustrated in FIG. 4. Note that the sheet information storing unit 401 and sheet holding unit information storing unit 402 may be held as storage areas in the HDD 308 of the printing machine 102, or may be held as storage areas in unshown nonvolatile memory which the information processing apparatus 104 has. In such a case, the data stored in the sheet information storing unit 401 and sheet holding unit information storing unit 402 may be referenced via the network 103.

The sheet information storing unit 401 holds attribute information of all sheets registered by the user, in list format (FIG. 7). Examples of sheet attribute information registered in the sheet information storing unit 401 include the sheet name, size, grammage, color, and type. Other sheet information which may be registered in the sheet information storing unit 401 includes, besides standard use sheets, sheets which the printer manufacturer has evaluated, and user-defined sheets where the user has customized standard sheets or evaluated sheets. The processing for registering sheet information in the sheet information storing unit 401 will be described later with reference to FIG. 5.

On the other hand, the sheet holding unit information storing unit 402 holds sheet attribute information of a particular sheet which has been selected by the user from all registered sheet attribution information held in the sheet information storing unit 401, and correlated with a particular sheet holding unit 322. Recall that the sheet holding unit control unit 321 is a module which saves sheet attribute information in sheet holding units 322 as setting values. The sheet attribute information is held for each sheet holding unit 322 in list format (FIG. 8) by the sheet holding unit control unit 321. The sheet attribute information registered in the sheet holding unit information storing unit 402 includes, in addition to the same settings as the sheet attribute information registered in the sheet information storing unit 401 (sheet name, size, grammage, color, and type), a priority flag setting to which the user optionally sets a value. Alternatively, the value of the priority flag may be automatically changed in accordance with the usage frequency of sheets registered in the sheet holding unit information storing unit 402, instead of the user optionally changing the settings.

In a case where the value of the priority flag is set to "True", this means that this sheet is frequently used. Accordingly, sheet attribute information of a sheet of which the value of the priority flag is set to "True" is saved as the setting values of the sheet holding units 322 with the No. 1 priority of all sheets correlated to the sheet holding units 322. In a case where the value of the priority flag is set to "False", this means that this sheet is not frequently used, but is sometimes or periodically used. The processing for registering sheet information in the sheet holding unit information storing unit 402 for each sheet holding unit will be described later with reference to FIG. 6.

Figure 5:
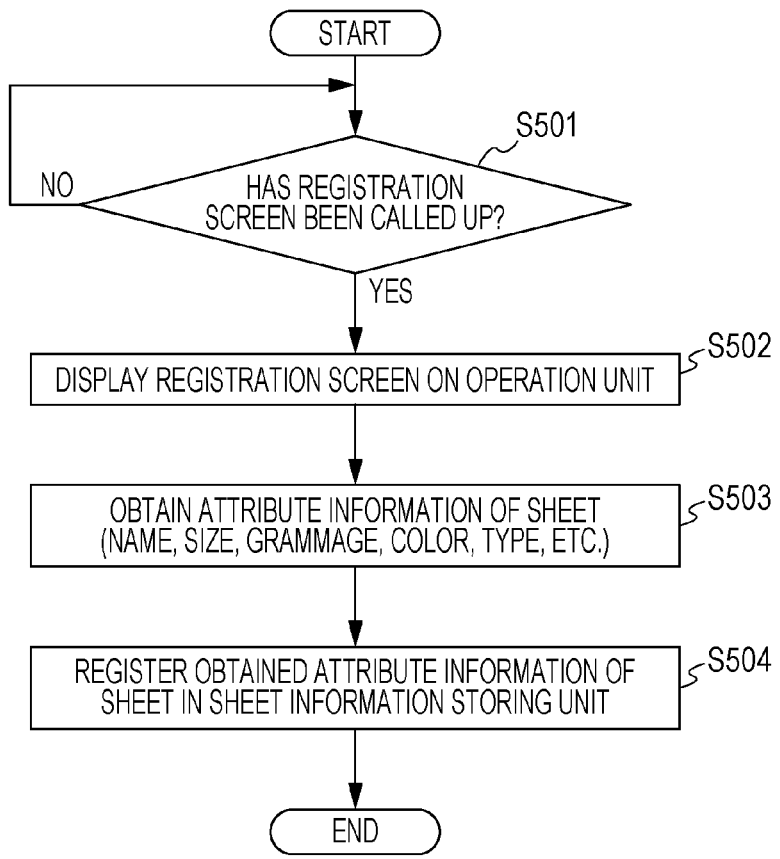
FIG. 5 is a flowchart for describing processing of registering sheet information in a sheet information storing unit in the server according to the first embodiment.

The processing for registering sheet information in the sheet information storing unit 401 will be described with reference to the flowchart in FIG. 5. This processing is carried out at the server 101 side, with the CPU 207 executing a program read out from the HDD unit 205 and loaded to the second memory unit 208. Note that while description will be made in the embodiments of the present invention regarding an arrangement where the processing of registering sheet information in the sheet information storing unit 401 is carried out at the server 101 side, this may be carried out at the printing machine 102 side. In a case of carrying this out at the printing machine 102 side, the processing is realized by the CPU 302 executing the program read out from the HDD 308 and loaded to the RAM 303. On the other hand, in a case where the information processing apparatus 104 takes on the role of operations of the server 101, the processing may be carried out at the information processing apparatus 104 side.

First, in S501, the CPU 207 determines whether or not a registration screen 701 such as illustrated in FIG. 7 has been called up. The registration screen 701 is displayed on the operation unit 209 of the server 101. Examples of the sheet attribute information include sheet name, size, grammage, color and type, in list format.

In a case where determination is made as a result of S501 that the registration screen 701 has been called up, the flow advances to S502. On the other hand, in a case where determination is made that the registration screen 701 has not been called up, the flow loops back to S501.

In S502, the CPU 207 displays the registration screen 701 on the operation unit 209 of the server 101, and the flow advances to S503.

In S503, the CPU 207 obtains attribute information such as the sheet name, size, grammage, color and type, which the user has input from an unshown sheet information input screen on the operation unit 209 of the server 101, and the flow advances to S504. Note that the sheet attribute information such as sheet name, size, grammage, color and type, may be imported from an external device, such as the information processing apparatus 104 or printing machine 102 or the like.

In S504, the CPU 207 registers the sheet attribute information obtained in S503 in the sheet information storing unit 401 held in the HDD unit 205 of the server 101, upon the user having pressed a registration button on the unshown sheet information input screen on the operation unit 209 of the server 101.

Details of the series of processing to register sheet information in the sheet information storing unit 401 have been described so far. In a case where this is to be carried out at the printing machine 102 side, each of the above steps can be reread as follows for description the same as when carrying out the processing at the server 101 side. Specifically, the "CPU 207", "operation unit 209", and "HDD unit 205" of the server 101 should be read as "CPU 302", "operation unit 318", and "HDD 308" of the printing machine 102.

Figure 6:
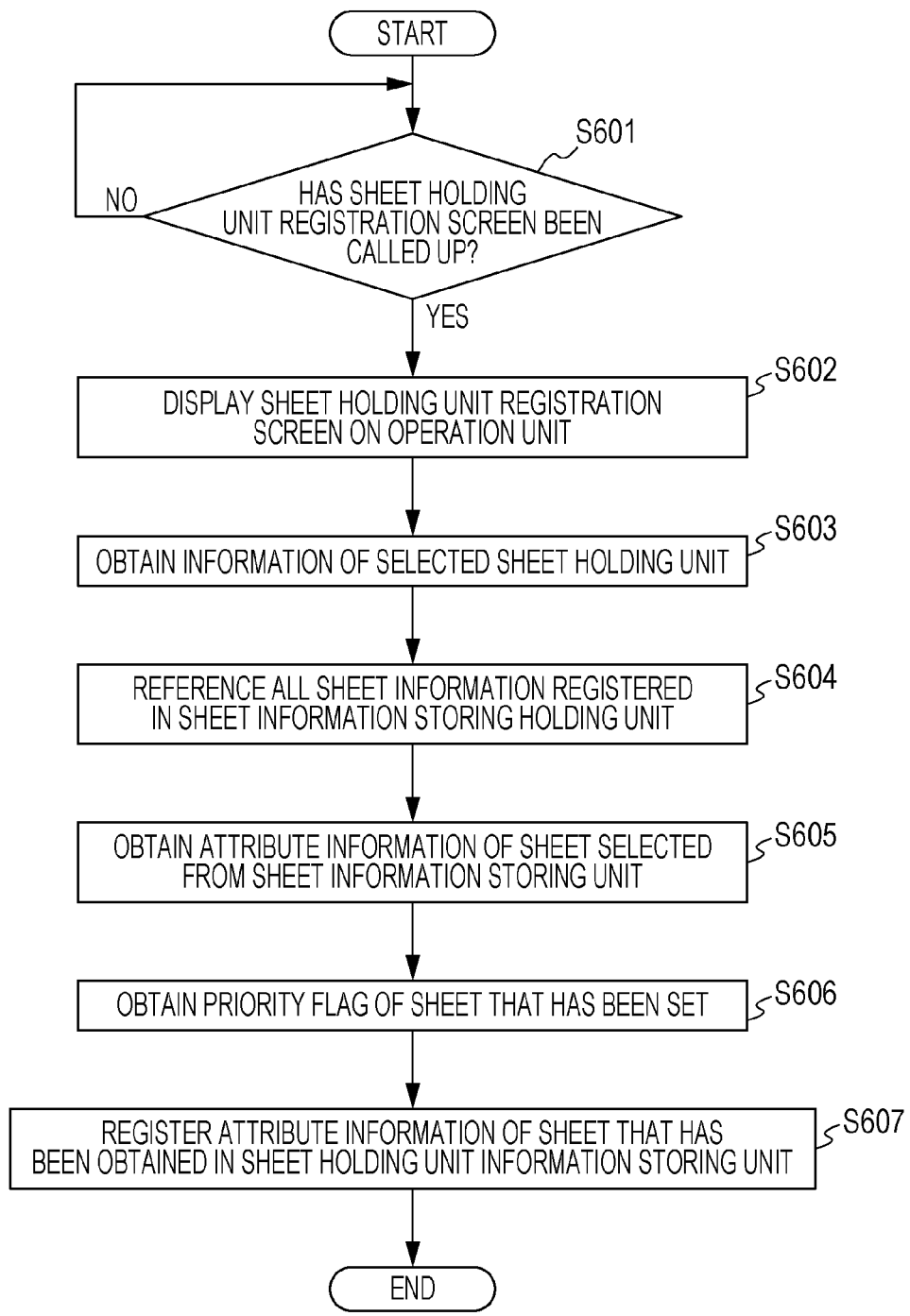
FIG. 6 is a flowchart for describing processing of registering sheet information in the sheet holding unit information storing unit for individual sheet holding units, in the server according to the first embodiment.

Next, the processing for a user to input information to register sheet information for each sheet holding unit 322 in the sheet holding unit information storing unit 402 will be described with reference to the flowchart in FIG. 6. This processing is carried out at the server 101 side, with the CPU 207 executing a program read out from the HDD unit 205 and loaded to the second memory unit 208. Note that while description will be made in the embodiments of the present invention regarding an arrangement where the processing of registering sheet information for each sheet holding unit 322 in the sheet holding unit information storing unit 402 is carried out at the server 101 side, this may be carried out at the printing machine 102 side. In a case of carrying this out at the printing machine 102 side, the processing is realized by the CPU 302 executing the program read out from the HDD 308 and loaded to the RAM 303. On the other hand, in a case where the information processing apparatus 104 takes on the role of operations of the server 101, the processing may be carried out at the information processing apparatus 104 side.

First, in S601 the CPU 207 determines whether or not a sheet holding unit registration screen 801 such as illustrated in FIG. 8 has been called up. Note that the sheet holding unit registration screen 801 is displayed on the operation unit 209 of the server 101. Examples of registered sheet attribute information include the sheet name, size, grammage, color, type, and priority flag, for each sheet holding unit 322, in list format.

For example, FIG. 8 shows sheet information of name "Paper2", size "A3", grammage "80 g/m$^2$", color "white", and type "plain paper", registered to both Tray1 and Tray2 which are sheet holding units 322. Thus, the sheet holding unit information storing unit 402 can register the same sheet information to multiple sheet holding units 322. On the other hand, the value of the priority flag of the sheet "Paper2" registered to Tray1 is "True", but the priority flag of the sheet "Paper2" registered to Tray2 is "False". In this way, the value of the priority flag of the same sheet information may be different depending on the sheet holding unit 322 the sheet is registered to.

In a case where determination is made in S601 that the sheet holding unit registration screen 801 has been called up, the flow advances to S602. On the other hand, in a case where the determination result of S601 is NO, the flow loops back on S601 until the sheet holding unit registration screen 801 is called up.

In S602, the CPU 207 displays the sheet holding unit registration screen 801 on the operation unit 209 of the server 101, and the flow advances to S603.

In S603, the CPU 207 obtains information of the sheet holding unit 322 which has been selected by the user on the operation unit 209 of the server 101, and the flow advances to S604.

In S604, the user references all sheet information registered in the sheet information storing unit 401 held in the HDD unit 205 of the server 101, that is displayed on the operation unit 209 of the server 101, selects one set of sheet attribute information, and the flow advances to S605.

In S605, the CPU 207 obtains the sheet attribute information which the user has selected from the sheet information reference in S604. Examples of the sheet attribute information obtained in S605 include sheet name, size, grammage, color and type. Note that the sheet attribute information such as sheet name, size, grammage, color and type, may be imported from an external device, such as the information processing apparatus 104 or printing machine 102 or the like.

Next, the flow advances to S606, and the CPU 207 obtains the value of the priority flag which the user has set at the operation unit 209 of the server 101, and the flow advances to S607.

In S607, the CPU 207 registers the sheet attribute information obtained in S605 and S606 in the sheet holding unit information storing unit 402 held in the HDD unit 205 of the server 101, upon the user having pressed a registration button on the unshown sheet information input screen on the operation unit 209 of the server 101. Examples of the sheet attribute information registered in the sheet holding unit information storing unit 402 include sheet name, size, grammage, color, type, and priority flag.

Details of the series of processing to register sheet information for each sheet holding unit 322 in the sheet holding unit information storing unit 402 have been described so far. In a case where this is to be carried out at the printing machine 102 side, each of the above steps can be reread as follows for description the same as when carrying out the processing at the server 101. Specifically, the "CPU 207", "operation unit 209", and "HDD unit 205" of the server 101 should be read as "CPU 302", "operation unit 318", and "HDD 308" of the printing machine 102.

A case is considered in the first embodiment where sheet attribute information to be used for a job has not been registered to any of the sheet holding units 322. Description will be made below regarding a case where, in response to a sheet holding unit 322 having been closed, the sheet holding unit information storing unit 402 is searched for the sheets stored in the closed sheet holding unit 322 based on the size of the sheets, and the attribute information of the sheets to be used for the job. Based on the search results, sheet attribute information corresponding to the attribute information of the job is then saved as setting values for the closed sheet holding unit 322, out of the sheets registered in the sheet holding unit information storing unit 402. The following description of the first embodiment will assume that the sheet information illustrated in FIG. 8 is already registered in the sheet holding unit information storing unit 402.

Figure 9A:
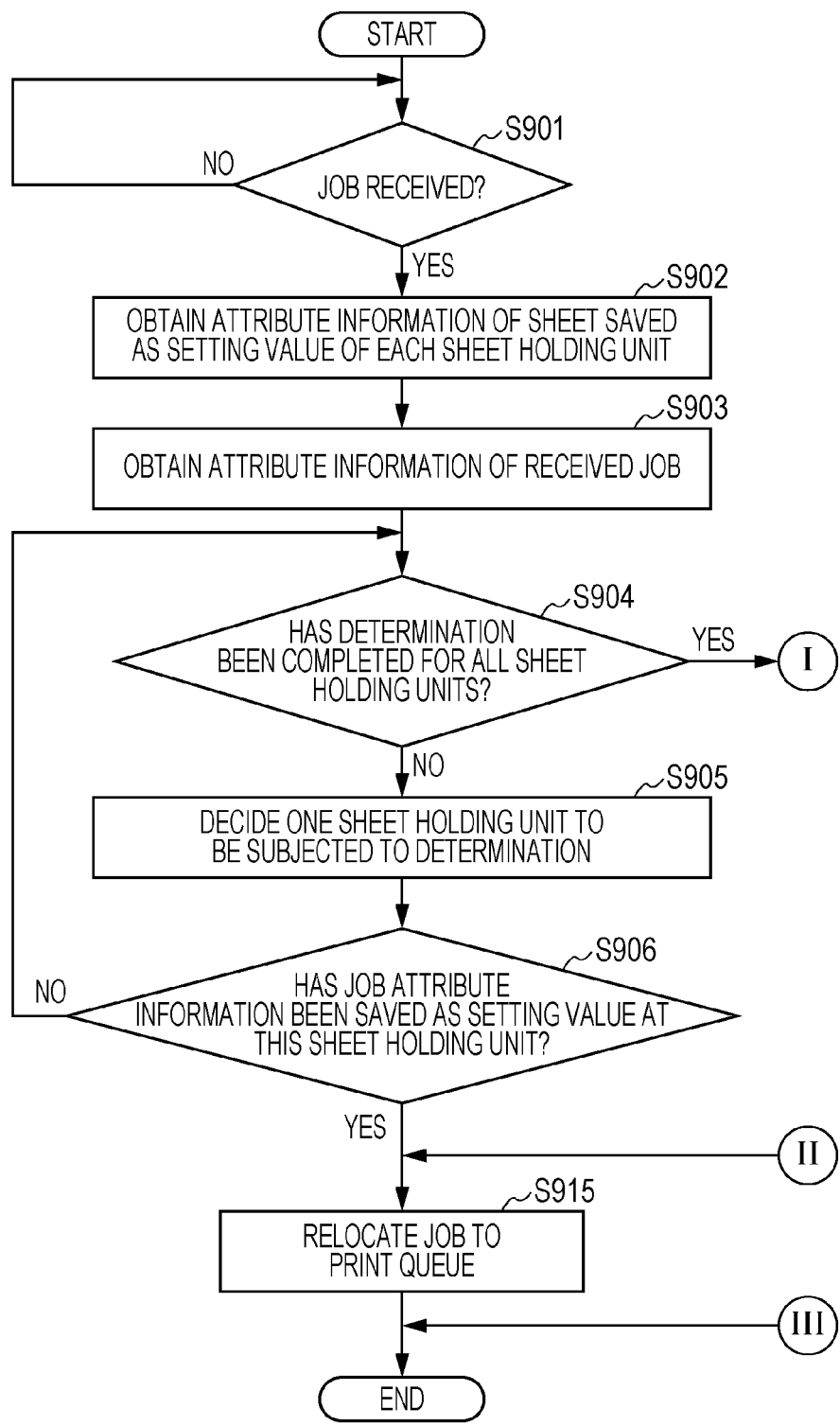
FIGS. 9A and 9B are a flowchart for describing processing to save sheet attribute in information sheet holding units, based on received job attribute information, in the printing apparatus according to the first embodiment.
Figure 9B:
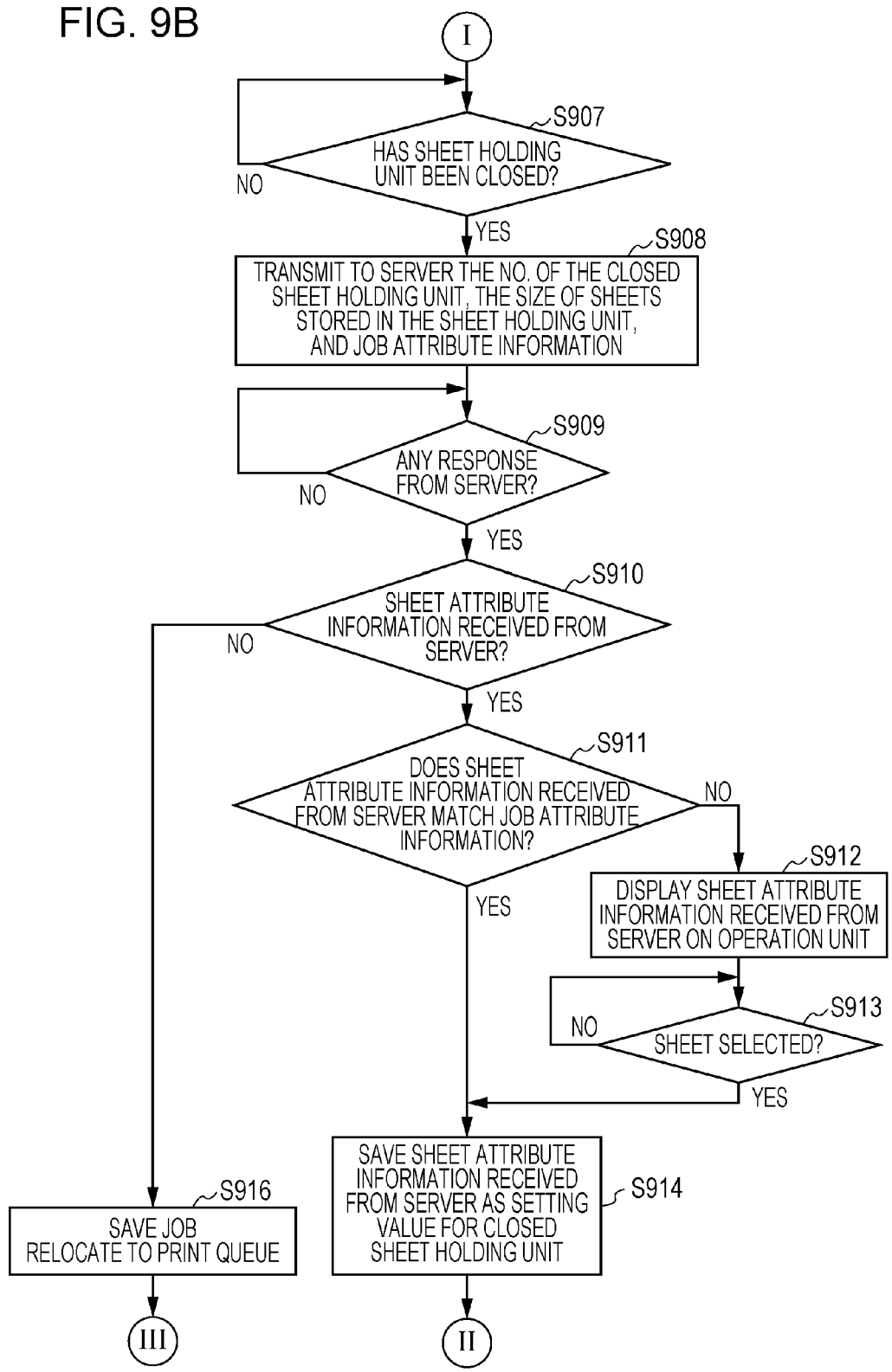

The series of processing of saving sheet attribute information as setting values for a sheet holding unit 322 in the printing machine 102 according to the first embodiment, based on the received job attribute information, will be described with reference to the flowchart in FIGS. 9A and 9B. This processing is carried out at the printing machine 102 side, with the CPU 302 executing a program read out from the HDD 308 and loaded to the RAM 303.

First, in S901, the CPU 302 determines whether or not the network interface 305 has received a job (print data). Note that the network interface 305 receives print data by print data received by the NIC unit 201 of the server 101 or print data temporarily written to the HDD unit 205 being transmitted from the connector 215 over the network 105 to the printing machine 102, where it is received by the network interface 305. Recall that video cable 106 is used to transfer print images and RAM 303 is an image memory which temporarily stores input image data. In a case where determination is made that a job has been received by the network interface 305, the flow advances to S902. Otherwise, the flow loops back on S901 until a job is received.

In S902, the CPU 302 obtains the sheet attribute information held as setting values of the sheet holding units 322 of the printing machine 102 from the sheet holding unit control unit 321, and the flow advances to S903. In S903, the CPU 302 obtains from the job stored in RAM 303 the job sheet attribute information to be used in the job received in S901, and the flow advances to S904.

In S904, the CPU 302 determines whether or not determination to be described later in S906 has been completed for all sheet holding units 322. If determination is made that this has not been completed, the flow advances to S905. In S905, the CPU 302 decides one sheet holding unit 322 for the determination to be described later in S906, and the flow advances to S906.

In S906, the CPU 302 determines whether or not the job attribute information obtained in S903 has been set to the sheet holding unit 322 decided in S905 as setting values. If determination is made that this has been saved, the flow advances to S915. The processing in S915 will be described later in detail. On the other hand, if determination is made that this has not been saved, the flow returns to S904.

On the other hand, if determination is made in S904 that the determination of S906 has been completed for all sheet holding units 322 (YES at S904), then there is no sheet holding unit 322 in the print machine 102 that has sheet attribute information setting values that match the setting values of the job sheet attribute information. The method now works to obtain sheet attribute information that may be saved in the sheet holding unit control unit 321 as the settings values of a sheet holding unit 322 that will be used in printing the job. If no such sheet attribute information can be obtained, then the job cannot be executed in such a state. The flow advances from S904 to S907.

In S907, the CPU 302 determines whether or not a sheet holding unit 322 which had been in an opened state has been closed. Assumption will be made that in S907 a sheet holding unit 322 has been opened to store sheets to be used for executing the job received in S901, the sheets are stored therein, and then the sheet holding unit 322 which had been in the opened state is closed. Closing of a sheet holding unit 322 which had been in the opened state can be determined by information received from the open/close detection sensor 326 in FIG. 3, and so forth.

In a case where determination is made in S907 that the sheet holding unit 322 has been closed, the flow advances to S908. If determination is made that the sheet holding unit 322 has not been closed, the flow loops back on S907.

In S908, the CPU 302 obtains the No. of the sheet holding unit 322 which has been determined to have been closed in S907. The CPU 302 also obtains the size of the sheets stored in this sheet holding unit 322 which has been determined to have been closed. Information about the size of the sheets stored in the sheet holding unit 322, which is sheet attribute information, can be determined by information obtained from the size detection sensor 325 in FIG. 3 and so forth. Continuing in step S908, the No. of the sheet holding unit 322 and the size of the sheets stored in the closed sheet holding unit 322 is then transmitted to the server 101 via the network 105, along with the job attribute information obtained in S903. The information which the printing machine 102 transmits in S908 is received by the server 101 in S1001 of FIG. 10 which will be described later.

The flow then advances to S909, where the CPU 302 determines whether or not there has been a response from the server 101 over the network 105. In a case where determination is made that there has been a response from the server 101, the flow advances to S910. Otherwise, the flow loops back on S909 until there is a response from the server 101. An arrangement may be made where the loop times out if there is no response from the server 101 for a predetermined amount of time, and the series of processing to save sheet attribute information as setting values of the sheet holding unit 322 based on the received job attribute information is escaped. The server 101 will respond to the information received from the printing machine 102 in S909, in a later-described S1008 in FIG. 10.

In S910, the CPU 302 determines whether or not sheet attribute information has been received from the server 101. The information which the printing machine 102 receives in S910 has been transmitted from the server 101 in S1005 or S1007 in FIG. 10 which will be described later. In a case where determination is made that sheet attribute information has been received from the server 101, the flow advances to S911.

In S911, the CPU 302 determines whether or not the sheet attribute information received from the server 101 matches all the job sheet attribute information received in S903. In a case where determination is made that these match, the flow advances to S914. Processing of S914 and thereafter will be described in detail later.

On the other hand, in a case where NO has been determined in S911, the flow advances to S912. In S912, the CPU 302 displays sheet attribute information received from the server 101 in a list format of candidates on the operation unit 318 of the printing machine 102, as illustrated as a selection screen 1101 in FIG. 11. The user can optionally select a candidate sheet from the candidates displayed in the selection screen 1101, regardless of the value of the sheet priority flag.

The flow then advances to S913, where the CPU 302 determines whether or not an optional candidate sheet has been selected by the user from the candidates displayed on the selection screen 1101. In a case where determination has been made that a selection has been made, the flow advances to S914. Otherwise, the flow loops back on S913 until a selection is made.

In S914, the CPU 302 saves the sheet attribute information received from the server 101 as the settings values of the sheet holding unit 322 which has been determined to have been closed in S907, following which the flow advances to S915.

In S915, the CPU 302 relocates the job received in S901 to a print queue. Note that a print queue is a queue to store a job regarding which a print instruction has been received, so that jobs are executed in the order in which the print instructions thereof have been received. The print queue is held as a storage region in the HDD 308 of the printing machine 102.

When executing the job relocated to the print queue in S915, the sheet conveyance speed and fixing unit temperature are controlled based on the sheet attribute information (grammage, color, and type) received from the server 101 in S910. Sheets stored in the sheet holding unit 322 determined to have been closed in S907 are fed from this sheet holding unit 322 to execute the job.

On the other hand, in a case where determination is made in S910 that sheet attribute information has not been received from the server 101, the flow advances to S916. In S916, the CPU 302 relocates the job received in S901 to a save queue. Note that a save queue is a queue for temporarily storing a job so as to be saved, and is held as a storage region of the HDD 308 of the printing machine 102. In a case where attribute information of a job regarding which a print instruction has been received is not saved as setting values of any sheet holding unit 322, the job cannot be executed in this state, so the job is temporarily saved in the save queue. On the other hand, in a case where attribute information of a job temporarily saved in the save queue has been saved as setting values of any one of the sheet holding units 322, the job is relocated to the print queue.

After processing of S915 or S916, the series of processing of saving sheet attribute information based on attribute information of the received job in a sheet holding unit 322 is ended.

Description has been made so far in detail of the series of processing of saving sheet attribute information as setting values, based on attribute information of the received job in a sheet holding unit 322. While FIGS. 9A and 9B have been described assuming that the type of sheets used by the job received in S901 is of one type, the present invention is not restricted thusly. A case where multiple types of sheets are to be used in the job received in S901 can be described in the same way be repeating the series of processing from S903 through S914 by a number of times equivalent to the number of types of sheets used of the job, so detailed description will be omitted.

Next, a series of processing of searching of sheets registered in the sheet holding unit information storing unit 402, based on the received job attribute information at the server 101 according to the first embodiment, will be described with reference to the flowchart illustrating in FIG. 10. This processing is carried out at the server 101 side, with the CPU 207 executing a program read out from the HDD unit 205 and loaded to the second memory unit 208. Note that while description is made in the first embodiment regarding an arrangement where the processing of registering sheet information in the sheet holding unit information storing unit 402 is carried out at the server 101 side, this may be carried out at the printing machine 102 side. In a case of carrying this out at the printing machine 102 side, the processing is realized by the CPU 302 executing the program read out from the HDD 308 and loaded to the RAM 303. On the other hand, in a case where the information processing apparatus 104 takes on the role of operations of the server 101, the processing may be carried out at the information processing apparatus 104 side.

First, in S1001, the CPU 207 receives the No. of the closed sheet holding unit 322, the size of the sheet stored in the closed sheet holding unit 322, and job attribute information, from the printing machine 102 via the network 105. Note that the information received by the server 101 in S1001 is transmitted by the printing machine 102 in the above-described S908 in FIG. 9.

The flow advances to S1002, where the CPU 207 determines, based on the job attribute information received from the printing machine 102 in S1001, whether or not the size of the sheets to be used in this job match the size of the sheets stored in the closed sheet holding unit 322.

In a case where determination is made that these do not match, the flow advances to S1008. In S1008, the CPU 207 responds to the printing machine 102 via the network 105 that the processing at the server 101 side has been completed. The information which the server 101 response in S1008 is received by the printing machine 102 in the above-described S909 in FIG. 9. After the processing of S1008, the series of searching for sheets registered in the sheet holding unit information storing unit 402 based on the received job attribute information ends.

In the other hand, in a case where determination is made in S1002 that these match, the flow advances to S1003. In S1103, the CPU 207 searches the sheet holding unit information storing unit 402 held in the HDD unit 205 of the server 101 for the sheets registered to the closed sheet holding unit 322, and the flow advances to S1004.

In S1004, the CPU 207 determines, based on the results of the search regarding whether or not there is in the sheet holding unit information storing unit 402 held in the HDD unit 205 of the server 101, the sheet registered corresponding to the closed sheet holding unit 322, which matches all attribute information of the job. Note that in a case where sheet size and type have been specified as job attribute information, for example, determination is made regarding whether or not a sheet of which the sheet size and type has been registered. On the other hand, in a case where sheet size, grammage, color, and type have been specified as job attribute information, determination is made regarding whether or not a sheet of which the sheet size, grammage, color, and type has been registered.

In a case where determination is made in S1004 that there is a registered sheet, the flow advances to S1005. In S1005, the CPU 207 transmits to the printing machine 102 the sheet attribute information in the sheet holding unit information storing unit 402 held in the HDD unit 205 of the server 101, registered corresponding to the closed sheet holding unit 322, which matches all attribute information of the job. After processing of S1105, the flow advances to S1008 for subsequent processing.

In a case where determination is made in S1004 that determination is made that the sheet is not registered, the flow advances to S1006. In S106, the CPU 207 determines, based on the results of the search, regarding whether or not there is in the sheet holding unit information storing unit 402 held in the HDD unit 205, a sheet registered corresponding to the closed sheet holding unit 322, which matches the size of the sheet to be used for the job.

In a case where determination is made that there is such a sheet registered, the flow advances to S1007. In the other hand, in a case where determination is made that there is none registered, the flow advances to S1008 for subsequent processing.

In S1007, the CPU 207 transmits, to the printing machine 102, sheet attribute information in the sheet holding unit information storing unit 402 held in the HDD unit 205 of the server 101, registered corresponding to the closed sheet holding unit 322, which matches the size of the sheet to be used for the job. Note that the information which the server 101 transmits in S1007 is received by the printing machine 102 in the above-described S910 in FIG. 9. After the processing of S1007, the flow advances to S1008 for subsequent processing.

The series of processing for searching for sheets registered in the sheet holding unit information storing unit 402 based on received job attribute information has thus been described in detail. In a case where this is to be carried out at the printing machine 102 side, each of the above steps can be reread as follows for description the same as when carrying out the processing at the server 101. Specifically, the "CPU 207" and "HDD unit 205" of the server 101 should be read as "CPU 302" and "HDD 308" of the printing machine 102.

A case example of searching for a sheet registered in the sheet holding unit information storing unit 402 based on received job attribute information, carried out at the server 101 side, will be described. Assumption will be made that there has been received from the printing machine 102 in S1001 that the No. of the closed sheet holding unit 322 is "Tray1", the size of sheets stored in the closed sheet holding unit 322 is "A4", and the job attribute information is "size 'A4', grammage '100 g/m$^2$', type 'plain paper'".

Determination in S1002 yields that the size of the sheets to be used for the job and the sheet size stored in Tray1 are both "A4" and thus match, so the flow advances to S1003.

In S1003, the sheet holding unit information storing unit 402 is searched for sheets registered corresponding to Tray1. In the example illustrated in FIG. 8, there are three types of A4 size sheets registered in the sheet holding unit information storing unit 402 corresponding to Tray1, and also two types of A3 size sheets.

Determination is S1004 yields that there are not sheets registered in the sheet holding unit information storing unit 402 corresponding to Tray1 which match all attribute information of the job (size "A4", grammage "100 g/m$^2$", type "plain paper"), so the flow advances to S1006.

Determination in S1006 yields that sheets matching the size of the sheets to be used for the job, which is "A4" are registered in the sheet holding unit information storing unit 402 corresponding to Tray1, so the flow advances to S1007.

In S1007, the attribute information of the three types of A4-sized sheets registered in the sheet holding unit information storing unit 402 corresponding to Tray1 is transmitted to the printing machine 102. In S1007, the specific sheet attribute information registered corresponding to Tray1 which is transmitted to the printing machine 102 is, for example, "name 'Company A Medial', size 'A4', grammage '62 g/m$^2$', color 'white', type 'plain paper', priority flag 'True'". Based on this sheet attribute information having been transmitted to the printing machine 102, a selection screen 1101 such as illustrated in FIG. 11 is displayed on the operation unit 318 of the printing machine 102 (S912).

As described above, a case has been considered in the first embodiment where attribute information of the sheet to be used for the job is not registered to any of the sheet holding units 322. That is to say, upon a sheet holding unit 322 having been closed, a search is performed in the sheet holding unit information storing unit 402 regarding sheets registered corresponding to a closed sheet holding unit 322, based on the size of sheets stored in the closed sheet holding unit 322 and received job attribute information. Based on the results of the search, sheet attribute information of sheets registered in the sheet holding unit information storing unit 402 and corresponding to the job attribute information can be saved as setting values of the sheet holding unit 322 that has been closed.

Thus, the user can easily save sheet attribute information corresponding to job attribute information, as setting values of the sheet holding unit 322, by closing the sheet holding unit 322. Accordingly, the trouble of inputting the sheet attribute information anew each time can be avoided. The trouble of searching for sheets registered in the sheet management database can also be avoided.

Note that in the first embodiment, description has been made regarding an arrangement where determination is made regarding whether or not sheet attribute information received from the server 101 matches the job attribute information. In a case where determination is made that these match, the flow advances to S914, and sheet attribute information received from the server 101 is saved as the setting values of the closed sheet holding unit 322. However, the present invention is not restricted to this arrangement, and another embodiment may be made where, even if determination is made in S911 that the sheets match, the flow advances to S912 and the sheet attribute information received from the server 101 is displayed in the selection screen 1101 on the operation unit 318 for user confirmation.

Also, description has been made regarding an arrangement where sheet attribute information received from the server 101 is saved as setting values of the closed sheet holding unit 322 in S914 and the job is relocated to the print queue in S915. An embodiment may be made where, in a case where execution of the job has been completed thereafter, a warning screen 1201 such as illustrated in FIG. 12 is displayed on the operation unit 318, prompting the user to remove the sheets temporarily placed in the sheet holding unit 322 and replace with sheets of which the priority is No. 1 (sheets of which the priority flag is "True"). This may prevent the user from forgetting to replace the sheets temporarily placed in the sheet holding unit 322 (sheets not priority No. 1) with the priority No. 1 sheets, which could lead to subsequent jobs being stopped or unintended printed products being generated.

Also in the first embodiment, description has been made regarding an arrangement where, upon a sheet holding unit 322 which had been in an opened state being closed, the size of the sheets stored in the sheet holding unit 322 is transmitted to the server 101 and subsequent processing is advanced, but the present invention is not restricted to this. For example, an embodiment may be made the operation unit 318 is provided with a button to transmit the size of the sheets stored in the sheet holding unit 322 to the server 101, so that upon this button having been pressed, the size of the sheets stored in the sheet holding unit 322 is transmitted to the server 101 and subsequent processing is advanced. Further, in the first embodiment, description has been made regarding an arrangement where, size is detected as one of the attribute information of sheets stored in the sheet holding unit 322, but an embodiment may be made where multiple kinds of sheet attribute information are detected and transmitted, and subsequent processing advanced based on these.

Also, in the first embodiment, description has been made regarding an arrangement where information to be transmitted to the server 101 is the size of sheets stored in the sheet holding unit 322, but the present invention is not restricted to this. For example, an embodiment may be made where a sensor provided to the sheet holding unit 322 is capable of detecting color, and sheet color information is also registered in the sheet information storing unit 401 and sheet holding unit information storing unit 402. In such a case, the sheet color information may be transmitted to the server 101 along with the sheet size, so as to decide sheets from the sheet color and size. Also, an arrangement may be made where the sheet color information alone is transmitted to the server 101 instead of the sheet size, so as to decide sheets from the sheet color alone.

The present invention is not restricted to the above-described embodiments; rather, various modifications based on the essence of the present invention (including organic combinations of the embodiments) may be made, which are not to be excluded form the scope of the invention.

Also, description has been made regarding an arrangement where information to be transmitted to the server 101 is the size of sheets stored in the sheet holding unit 322, but the present invention is not restricted to this. For example, an embodiment may be made where a sensor provided to the sheet holding unit 322 is capable of detecting sheet color, grammage, type, or the like, the information of sheet color, grammage, type, and so forth may be transmitted to the server 101 along with the sheet size, so as to decide sheets from the sheet color, grammage, type, or the like, and the size.

That is to say, in a case where attribute information including at least one of sheet size, grammage, color, and type is obtained as attribute information of sheets stored in the sheet holding unit 322, at least one attribute information other than the sheet size may be included and set as the setting values of the sheet holding unit 322.

Also in the first embodiment, description has been made regarding an arrangement where the printing machine 102 and an external server 101 are connected by a network 105. However, the present invention is not restricted to this arrangement, and an embodiment may be made where part or all of the above-described various types of control are executable by the printing machine 102 and the server 101 which is a printing control apparatus built into the printing machine 102. Alternatively, part or all of the above-described various types of control may be executable by the printing machine 102 alone, without processing of the server 101 serving as a printing control apparatus. That is to say, the server 101 serving as a printing control apparatus may be included in the printing machine 102. Also, part or all of the above-described various types of control may be executable by the printing machine 102 and multiple information processing apparatuses 104 over a network 103 such as a LAN or WAN, or over a wireless LAN or the like.

While the present invention has been described by way of examples and embodiments, it will be clearly understood by one skilled in the art that the spirit and scope of the present invention is not restricted to any particular description made in the present specification.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-184051, filed Sep. 5, 2013, which is hereby incorporated by reference herein in its entirety.

What is claimed is:

1. A printing apparatus to print an image on a sheet stored in a sheet holding unit, the printing apparatus comprises:
    a storage configured to store a plurality of registered sheet attribute information;

an obtaining unit configured to obtain job sheet attribute information designated in a print job, wherein the job sheet attribute information includes sheet size information and at least first type of sheet attribute information and second type of sheet attribute information;

a determining unit configured to determine whether attribute information specified for the sheet holding unit and in registered sheet attribute information selected from the plurality of registered sheet attribute information matches all the attribution information in the obtained job sheet attribute information and, if not, the determining unit is configured to determine whether sheet size information specified for the sheet holding unit and in registered sheet attribute information selected from the plurality of registered sheet attribute information matches the obtained sheet size information;

a setting unit configured to set registered sheet attribute information as sheet attribute information of the sheet holding unit, wherein, in a case where it is determined that attribute information specified for the sheet holding unit and in a selected registered sheet attribute information matches all the attribution information in the obtained job sheet attribute information, the setting unit sets the matching selected registered sheet attribute information as the attribute information of the sheet holding unit, and wherein, in a case where it is determined that sheet size information specified for the sheet holding unit and in selected registered sheet attribute information matches the obtained sheet size information, the matched selected registered sheet attribute information is added to a list and the setting unit sets a registered sheet attribute information selected by a user from the list as the attribute information of the sheet holding unit; and a printer configured to print, based on the registered sheet attribute information set by the setting unit, an image on the sheet conveyed from the sheet holding unit, wherein the obtaining unit, the determining unit, and the setting unit are implemented by at least one processor and a memory.

2. The printing apparatus according to claim 1, wherein, in a case where sheet size information in the job sheet attribute information does not match sheet size information of the sheet stored in the sheet holding unit, the setting unit does not set registered sheet attribute information as sheet attribute information of the sheet holding unit.

3. The printing apparatus according to claim 2,
wherein the sheet holding unit is a plurality of sheet holding units, each of which are able to be opened and closed, and
wherein, in response to it being detected that an open first sheet holding unit of the plurality of sheet holding units is closed, the obtaining unit obtains the job sheet attribute information designated in the print job, and the determining unit determines whether attribute information specified for the sheet holding unit and in registered sheet attribute information selected from the plurality of registered sheet attribute information matches all the attribution information in the obtained job sheet attribute information.

4. The printing apparatus according to claim 1, wherein the second type of attribute information includes at least one of sheet grammage, a sheet color, and a sheet type.

5. The printing apparatus according to claim 1, further comprising a notification unit configure to notify a user of the list of matched selected registered sheet attribute information.

6. The printing apparatus according to claim 5, wherein the notification unit notifies on a screen, as the list, a plurality of matched selected registered sheet attribute information to be selected.

7. The printing apparatus according to claim 6, wherein the notification unit notifies, on the screen, the user of the sheet size information designated in the job and the first type of sheet attribute information designated in the job.

8. The printing apparatus according to claim 1, wherein, in a case where execution of the job has been completed, the notification unit further is configured to display a warning screen containing a message to the user to remove sheets placed in the sheet holding unit and replace with sheets having a print priority that is higher than a print priority of the removed sheets.

9. A control method for a printing apparatus to print an image on a sheet stored in a sheet holding unit, wherein the printing apparatus includes a storage configured to store a plurality of registered sheet attribute information, the control method comprising obtaining job sheet attribute information designated in a print job, wherein the job sheet attribute information includes sheet size information and at least first type of sheet attribute information and second type of sheet attribute information;

determining whether attribute information specified for the sheet holding unit and in registered sheet attribute information selected from the plurality of registered sheet attribute information matches all the attribution information in the obtained job sheet attribute information and, if not, determining includes determining whether sheet size information specified for the sheet holding unit and in registered sheet attribute information selected from the plurality of registered sheet attribute information matches the obtained sheet size information;

setting registered sheet attribute information as sheet attribute information of the sheet holding unit, wherein, in a case where it is determined that attribute information specified for the sheet holding unit and in a selected registered sheet attribute information matches all the attribution information in the obtained job sheet attribute information, setting includes setting the matching selected registered sheet attribute information as the attribute information of the sheet holding unit; and holding unit, and wherein, in a case where it is determined that sheet size information specified for the sheet holding unit and in selected registered sheet attribute information matches the obtained sheet size information, the matched selected registered sheet attribute information is added to a list and setting includes setting a registered sheet attribute information selected by a user from the list as the attribute information of the sheet holding unit; and printing, by a printer and based on the set registered sheet attribute information, an image on the sheet conveyed from the sheet holding unit.

10. A non-transitory computer readable storage medium storing a computer program to cause a printing apparatus to perform a control method, wherein the printing apparatus includes a storage configured to store a plurality of registered sheet attribute information, the control method comprising:

obtaining job sheet attribute information designated in a print job, wherein the job sheet attribute information includes sheet size information and at least first type of sheet attribute information and second type of sheet attribute information;

determining whether attribute information specified for the sheet holding unit and in registered sheet attribute information selected from the plurality of registered sheet attribute information matches all the attribution information in the obtained job sheet attribute information and, if not, determining includes determining whether sheet size information specified for the sheet holding unit and in registered sheet attribute information selected from the plurality of registered sheet attribute information matches the obtained of sheet size information;

setting registered sheet attribute information as sheet attribute information of the sheet holding unit, wherein, in a case where it is determined that attribute information specified for the sheet holding unit and in a selected registered sheet attribute information matches all the attribution information in the obtained job sheet attribute information, setting includes setting the matching selected registered sheet attribute information as the attribute information of the sheet holding unit, and wherein, in a case where it is determined that sheet size information specified for the sheet holding unit and in selected registered sheet attribute information matches the obtained sheet size information, the matched selected registered sheet attribute information is added to a list and setting includes setting a registered sheet attribute information selected by a user from the list as the attribute information of the sheet holding unit; and printing, by a printer and based on the set registered sheet attribute information, an image on the sheet conveyed from the sheet holding unit.

* * * * *